United States Patent [19]
Monnet

[11] 3,996,954
[45] Dec. 14, 1976

[54] AUTOMATIC PRESSURE REGULATOR

[75] Inventor: Francois Monnet, Nice, France

[73] Assignee: Cession a la Societe Europeenne de Distribution Electromecanique "S.E.D.E.M.", Marseille, France

[22] Filed: Apr. 15, 1975

[21] Appl. No.: 568,374

[30] Foreign Application Priority Data
Apr. 17, 1974 France .................... 74.14319

[52] U.S. Cl. .................... 137/116.3; 137/489.5
[51] Int. Cl.² .................... F16K 31/365
[58] Field of Search .......... 137/116.3, 116.5, 489, 137/489.5, 505.26, 505.29, 505.34, 505.35, 505.36, 505.11, 505.19

[56] References Cited
UNITED STATES PATENTS

| | | | |
|---|---|---|---|
| 389,082 | 9/1888 | Jackson | 137/505.19 |
| 682,085 | 9/1901 | Kaeferle | 137/505.19 |
| 2,051,299 | 8/1936 | Howell | 137/116.3 |
| 2,309,848 | 2/1943 | King | 137/489.5 X |
| 2,707,966 | 5/1955 | Taplin | 137/505.34 X |
| 2,761,464 | 9/1956 | Faust | 137/505.26 X |
| 2,912,997 | 11/1959 | Griswold | 137/489.5 X |
| 2,994,334 | 8/1961 | Loveless | 137/116.5 X |
| 3,357,443 | 12/1967 | Brumm | 137/489.5 X |
| 3,774,628 | 11/1973 | Norton et al. | 137/505.41 X |

*Primary Examiner*—William R. Cline
*Attorney, Agent, or Firm*—Young & Thompson

[57] ABSTRACT

An automatic pressure regulator comprises an expansion chamber, a rod reciprocable in the expansion chamber and carrying two valves, one of the valves regulating the entry of compressed air into the expansion chamber and the other of the valves regulating communication between the expansion chamber and the ambient air. A utilization air conduit is provided for connecting the expansion chamber to a measuring device. A diaphragm connected to the valve rod is moved by pressure in a regulating chamber that communicates with a pilot conduit that in turn communicates between the ends of a pilot air conduit which receives compressed air at one end, for example from the expansion chamber, and at its other end is opened or closed by a float valve in one leg of a manometer whose other leg communicates with the air utilization conduit.

3 Claims, 2 Drawing Figures

AUTOMATIC PRESSURE REGULATOR

The present invention relates to automatic pressure regulators, for example of the type used in the calibration of carburetors.

It is an object of the present invention to provide such a pressure regulator, which will permit one to obtain with very great precision the predetermined pressure at a particular point no matter what the distance between that point and the pressure regulator.

Another object of the present invention is the provision of such a pressure regulator, which will be relatively simple and inexpensive to manufacture, easy to assemble, operate, maintain and repair, and rugged and durable in use.

Numerous expansion devices are known which are more or less accurate but which in no case permit the effectuation of micrometric operations, for example for the calibration of nozzles or the measurement of air flow through the passages of a carburetor, no matter what the distance between the point of utilization of the pressure and the pressure regulator. Moreover, known expansion devices are generally specific to a particular air feed pressure and if it is desired to utilize various pressures, it is necessary to change the expander each time so as to provide an appropriate expander.

The regulator of the present invention avoids all of these drawbacks.

The invention consists in positioning after the expander of a known type connected to the feed conduit, an automatic pressure regulator connected between the feed conduit and the utilization conduit.

The pressure regulator comprises a diaphragm that actuates first a valve to open and close the passage to the ambient air, to an expansion chamber and that actuates next a valve disposed at the entrance to said expansion chamber into which opens from above the air feed conduit, and, downwardly the conduit leading to the measurement apparatus. The diaphragm is subjected pneumatically to the pressure prevailing in a regulator chamber fed by a pilot conduit connected to an air pilot conduit whose one end is connected to a source of air and whose other end opens to the ambient atmosphere and whose opening and closing are activated by means of a flow valve acting through an ambient air manometer connected at the bottom to said regulator at the level of the utilization conduit, the liquid height being calculated as a function of the pressure which it is desired to obtain at the junction point between the legs of the ambient air manometer and the utilization air conduit leading to the measurement apparatus. The ambient air manometer reacts very precisely to the pressure difference in the utilization conduit and will close, by the float valve, the end of the pressure air conduit, which will pressurize the pilot conduit and the regulator chamber controlling the diaphragm and the two valves, in a manner to reestablish the desired pressure.

The accompanying drawings given by way of nonlimitative example, will permit easy comprehension of the invention according to a preferred embodiment.

Figure 1:
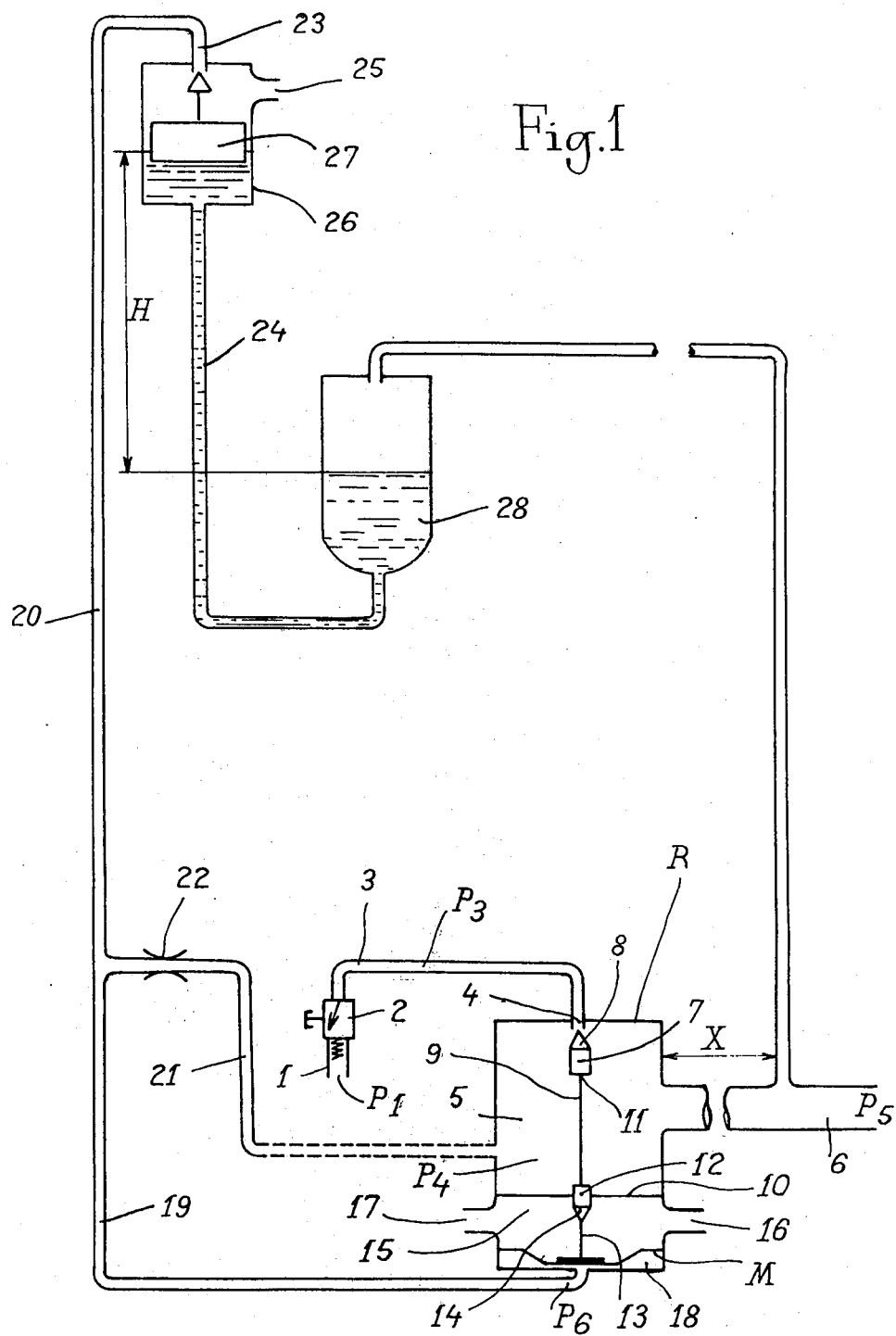
FIG. 1 is a schematic view of the mounting of the automatic pressure regulator and of the various conduits.
Figure 2:
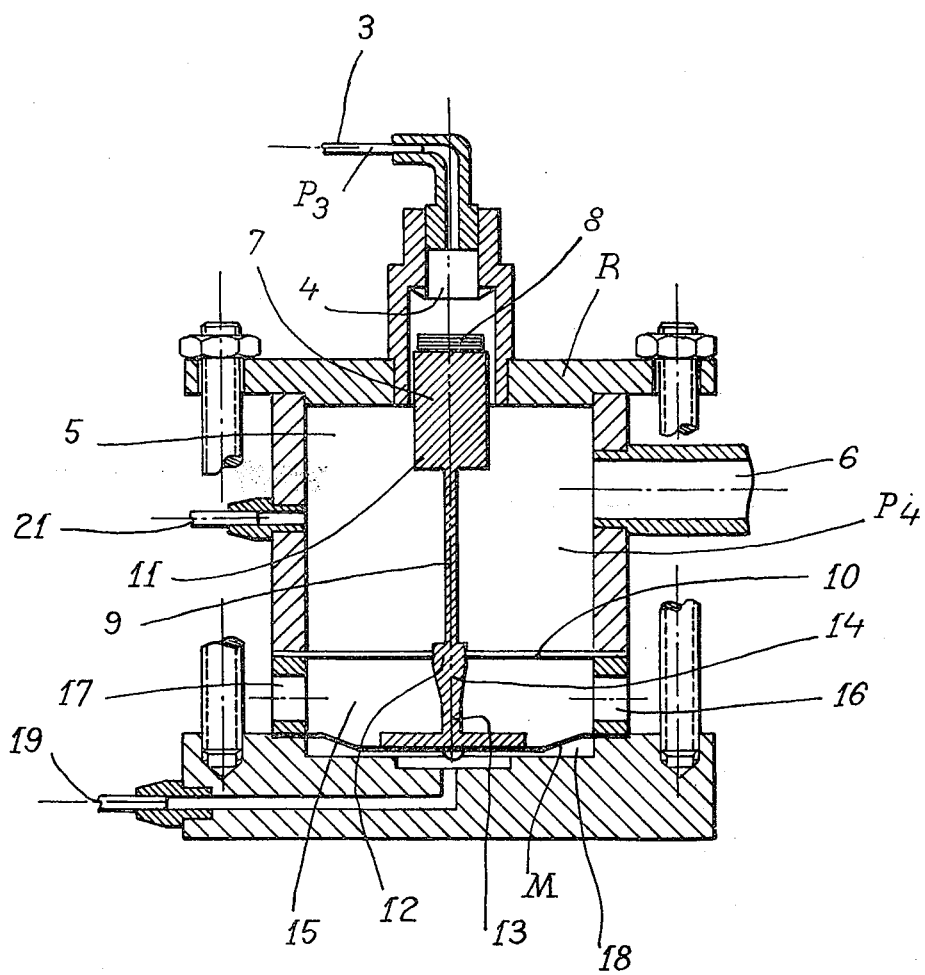
FIG. 2 is a detailed view of an automatic pressure regulator according to a preferred embodiment.

The conduit 1 is connected to a compressed air inlet at a pressure $P_1$, for example 7 kg/cm$^2$; a conventional expander 2 is disposed immediately thereafter, as a safety measure, in the case of a low pressure regulator, in case of failure of one of them or of improper manipulation. The pressure regulator R is disposed between the feed conduit 3 (upper conduit) and the lower utilization conduit 6, under regulated pressure, which extends to the measurement apparatus. Conduit 3 for air under a pressure $P_3$ (about 600 mm of water of 1.26 kg/cm$^2$), opens into the top of regulator R into means comprising a variable expander 4, permitting the obtention of a pressure $P_4$, in a chamber 5 from which the air under pressure may leave by utilization conduit 6 leading to the measurement apparatus. At the level of the measurement apparatus, the desired pressure should be a pressure $P_5$ for example a pressure of 500 mm of water or 50 g or 1.05 kg/cm$^2$. The pressure regulator R comprises a valve 7 whose head carries a seal 8, actuated by a rod 9 whose end 11 is connected to valve 7 and whose other end 12 leaves the chamber by an opening in a disc 10. At this end 12 is disposed another valve 13 whose lower conical end 14 may close the air passage through the opening of disc 10. The valve 13 is secured to a diaphragm M which delimits the lower part of a chamber 15, the upper part being closed by the disc 10, having orifices 16 and 17 communicating with the ambient air. The diaphragm M is pneumatically subjected to the pressure prevailing in chamber 18, which is the regulating pressure. This regulating chamber 18 is connected to a pilot conduit 19, which is connected to a pilot air conduit 20 whose one end 21 is connected either to a source of compressed air (not shown or which may be connected directly to chamber 5 as shown in broken lines in FIG. 1). Immediately thereafter, in this end 21 of the pilot air conduit 20, a throttle 22 is disposed which balances, by means of its cross-sectional area, the pressure so that the diaphragm M begins to be influenced when the float valve 27 begins to close the air outlet 23 (FIG. 1) which is at the other end 23 of pilot air conduit 20, and which empties into the top of a free air manometer 24. In its upper part 26, the manometer tube communicates with ambient air through an opening 25. This opening 25 is so sized as not to create a back pressure in the upper part of the free air manometer 24. A float valve 27 is disposed in the portion 26 of manometer 24 so as to close the end 23 when there is a variation in the height H of liquid 28.

The height H of the liquid is calculated as a function of the compressed air pressure which it is desired to obtain at point $P_5$, for example 500 mm of water (1.05 kg/cm$^2$), at a distance x meters from the regulator R.

In fact, the compressed air utilization pressure continuously varies as a function of the flow or loss of the charge which creates it, which is intolerable if one wishes to carry out micrometry.

According to FIG. 1, it will be understood that the pressure $P_4$ will ordinarily always be higher than $P_5$ — $P_5$ being x meters away from the automatic pressure regulator R,— so as to compensate charge losses due to the utilization conduit 6. If the manometer 24 is set for a pressure of 500 mm of water (1.05 kg/cm$^2$), it will be understood that the float valve 27 will close orifice 23 of the air pilot conduit 20, when the pressure $P_5$ is higher than 500 mm of water. This air pilot conduit 20 will thus place the regulating chamber 18 under pressure $P_6$ by the pilot conduit 19. Diaphragm M will then actuate valve 13 which, upon rising, on the one hand opens the air passage of the chamber 5 through the orifice of disc 10, through compartment 15 and finally to the ambient air through the openings 16 and 17, and on the other hand actuates valve 7 which, upon rising, expands still further the feed air. The pressure $P_5$ very rapidly returns to the desired pressure, or to a pressure corresponding to a column of 500 mm of water. As has already been indicated, the end 21 of the pilot air conduit 20 may be connected to a compressed air source or directly to the chamber 5 as shown in broken lines.

If on the other hand the pressure falls, that is to say if in $P_5$ the pressure is lower than a pressure corresponding to 500 mm of water, compressed air arriving through air pilot conduit 20 escapes to the ambient air through opening 25. As a result, the pressure $P_6$ exerts less influence on the diaphragm M which simultaneously closes the opening of disc 10 by means of valve 13 and opens the valve 7 until the desired pressure $P_5$ is reestablished.

It will therefore be understood that the automatic pressure regulator R makes it possible to obtain, with very great precision, a desired pressure at a particular point no matter what the variation in flow rate or the loss of charge and the distance between the regulator R and the measurement apparatus, thus permitting numerous applications in micrometry. The invention may be equally well applied to the regulation of gasometry.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for regulating the pressure of a fluid in a conduit, comprising a source of said fluid under pressure, and between said source and said conduit a body subdivided into three chambers, the first of said chambers being separated from a second of said chambers by a fixed partition, and said second chamber being separated from a third of said chambers by a diaphragm, said first chamber communicating with said conduit and said source, said second chamber communicating with the ambient air, said third chamber communicating with a liquid manometer first portion and a source of pressurized fluid, a pilot valve actuated by said manometer to open and close said third chamber to the ambient air, a second portion of said manometer communicating with said conduit, a rod secured to said diaphragm, and two valves carried by said rod, one of said two valves closing the communication between said first mentioned source and said first chamber at the same time that the other of said two valves opens said fixed partition, said other valve closing said fixed partition at the same time that said one valve opens said first mentioned source to said first chamber.

2. Apparatus as claimed in claim 1, in which said pilot valve is carried by a float that floats in a chamber that contains a portion of the liquid of said liquid manometer, so that when said liquid in said manometer chamber rises, said pilot valve closes, and when said liquid falls, said pilot valve opens, thereby selectively to interrupt and establish, respectively, communication between said third chamber and the ambient air according to the pressure in said conduit.

3. Apparatus as claimed in claim 2, said manometer having two legs, one of said legs communicating with said conduit and the other of said legs communicating with said float chamber.

* * * * *